United States Patent [19]

Geiger et al.

[11] Patent Number: 4,628,345

[45] Date of Patent: Dec. 9, 1986

[54] CIRCUIT FOR ANALOG DIGITAL CONVERSION OF A COLOR TELEVISION SIGNAL EMPLOYING VARIABLE SIGNAL AMPLIFICATION

[75] Inventors: Erich Geiger, Unterkirnach; Bernhard Otto, VS-Rietheim; Jürgen Kaaden, VS-Pfaffenweiler, all of Fed. Rep. of Germany

[73] Assignee: Deutsche Thomson-Brandt GmbH, Villingen, Fed. Rep. of Germany

[21] Appl. No.: 651,272

[22] Filed: Sep. 14, 1984

[30] Foreign Application Priority Data

Sep. 14, 1983 [DE] Fed. Rep. of Germany ....... 3333071

[51] Int. Cl.$^4$ .......................... H04N 11/04; H04N 9/68
[52] U.S. Cl. ......................................... 358/13; 358/14; 358/27; 358/318
[58] Field of Search ....................... 358/12, 13, 19, 14, 358/27, 318

[56] References Cited

U.S. PATENT DOCUMENTS

| | | | |
|---|---|---|---|
| 3,781,463 | 12/1973 | Van den Bussche | 358/12 |
| 4,063,290 | 12/1977 | Metildi et al. | 358/318 |
| 4,163,248 | 7/1979 | Hertmann | 358/14 |
| 4,251,802 | 2/1981 | Horna | 358/13 |
| 4,356,506 | 10/1982 | Yamamitsu | 358/318 |
| 4,388,638 | 6/1983 | Dischert et al. | 358/13 |
| 4,459,613 | 7/1984 | Faroudju | 358/318 |
| 4,556,900 | 12/1985 | Willis | 358/13 |

Primary Examiner—John W. Shepperd
Attorney, Agent, or Firm—Horst M. Kasper

[57] ABSTRACT

An analog digital conversion is provided for two color difference signals, for example for a recording according to a timeplex method. The color difference signals are adjusted in their amplitude at the input of the analog digital converter such that the modulation range of the analog digital converter is always fully used independent of the original amplitude of the color difference signal. The amplitude is restored back to its original value after a digital to analog reconversion. This results in an improvement of the signal to noise ratio during the transmission. The amplification provided to the various signals can be controlled by comparator circuits comparing the signal level with a reference signal.

19 Claims, 3 Drawing Figures

CIRCUIT FOR ANALOG DIGITAL CONVERSION OF A COLOR TELEVISION SIGNAL EMPLOYING VARIABLE SIGNAL AMPLIFICATION

BACKGROUND OF THE INVENTION

1. Field of the Invention

The present invention relates to a method employing analog digital conversion of color television signals for increasing the signal to noise ratio during transmission of such a signal.

2. Brief Description of the Background of the Invention Including Prior Art

It is known that for color television the reproduction of the picture employs three signals which are transmitted, that is, the capatible luminance signal Y and the two color difference signals B-Y and R-Y. In commercial color television emission the luminance signal Y is transmitted by amplitude modulation of a picture, and the two color difference signals are transmitted by quadrature modulation of a color carrier.

If a digital signal transmission is performed within a transmission path then the three analog signals have to be converted into digital signals with analog to digital converters. An example for such a digital signal transmission is the so-caleed timeplex system for the transmission or recording of color television signals as it is described for example in "Fernseh- und Kino- Technik" 1983, pp. 187–196 and in particular, on pp. 193 and 194. All signals are time compressed for a transmission or recording and after the transmission and recording they are time expanded according to this system. The analog to digital conversion and digital to analog conversion is required, since the clocked memory storage serving for time compression and time expansion processes digital signals. According to the timeplex system alternatingly from line to line on the time compressed color difference signal B-Y and the time compressed luminance signal and on the other hand the time compressed color difference signal R-Y and the time compressed luminance signal Y are transmitted or recorded.

The signals Y, B-Y, R-Y are independent of each other in their amplitudes and therefore they are not to be mixed. Therefore in principal three separate analog to digital converters are required for the analog to digital conversion. Because of the different amplitudes of the signals the required modulation range of the converters cannot always be fully employed such that in particular in the case of small signal amplitudes, a small signal relative to noise is generated.

SUMMARY OF THE INVENTION

1. Purposes of the Invention

It is an object of the present invention to provide a system for the analog to digital conversion of color television signals which uses as small a number of analg to digital converters as possible.

It is another object of the invention to use the modulation range of the analog to digital converters as optimally as possible and independently from the signal amplitude of an incoming signal.

It is a further object of the invention to provide a good signal to noise ratio during the transmission in order to avoid defective and interference signals in the receiver apparatus.

These and other objects and advantages of the present invention will become evident from the description which follows.

2. Brief Description of the Invention

The present invention provides a circuit for analog digital conversion of a color television signal which comprises an input path for a luminance signal, an input path for a first color difference signal, an input path for a second color difference signal, amplitude adjustment means associated with path of the first color difference signal and associated with the path of the second color difference signal for adjusting the maximum amplitudes of the color difference signals independently of their original amplitude, and an analog digital converter connected to the output of the amplitude adjustment means.

The amplitude adjustment means can control the color difference signals such that the maximum amplitudes reach about the full modulation range of the converter. The two color difference signals can be adjusted to the same maximum amplitudes and the two color difference signals can be applied to the same analog digital converter. A switch can be actuated by the line frequency and can have its input connected to the amplitude adjustment means and its output connected to the input of an analog digital converter. The luminance signal including the sync pulses and the color difference signals (B-Y, R-Y) preferably have the same maximum amplitudes at the inputs of the converter. A digital analog converter can be provided for receiving a sequence of digital color difference signals (B-Y, R-Y) at its input, an output path can be furnished for a luminance signal, for a first color difference signal and for a second color difference signal. A second switch can be connected to an output of the digital analog converter and actuated according to the line frequency for providing alternatingly a signal to the two color difference output paths. An amplitude adjustment provision is preferably connected to the digital analog converter for generating color difference signals having again their original different maximum amplitudes. The amplitude adjustment means can be controlled by a correcting variable derived from the signal amplitude such that the signal assumes continuously about the full modulation range of the converter independently of its original amplitude. A rectifier can be connected to the input of the analog to digital converter for rectifying the peak values of the signal. A low pass filter preferably has a time constant of from about 20 to 500 milliseconds and is disposed in the path of the correcting variable following the rectifier.

The maximum amplitude of the color difference signal (B-Y) can be determined during a defined period of time (t2-t1) and the amplitude of the signal can be controlled such that the maximum amplitude covers the modulation range for the duration of a time period with a constant correcting variable obtained from the signal (B-Y). The correcting variable obtained during a time period (t1-t2) preferably controls in the sequentially following time period (t2-t4) the amplitude of of the signal delayed by the duration of the time period. Preferably, the time duration period is about equal to the scanning period. The value of the correcting variable can be transmitted with a control signal over the transmission distance fed by the ananlog to digital converter and the value of the correcting variable preferably serves to reset the signal amplitude to the original value after a digital to analog conversion.

A first switch can be connected to an output of the amplitude adjustment means, a first amplifier can be connected to the output of the first switch and to the input of the analog digital converter, and a coder can be connected to an output of the analog to digital converter and can have an output for transmitting a signal. An oscillator can generate a color carrier signal. An analog digital converter can be connected to the input path of the luminance signal and can have its output connected to the coder. A first gate can have an input connected to an output of the oscillator. A second amplifier can have its input connected to the output of the gate. A second gate can be connected to the output of the first switch. A peak value rectifier can have an input connected to an output of the second gate and can have an output connected to the first amplifier and to the second amplifier for modulation of the respective amplification factor. A connection from the coder to the first switch can provide a switching voltage of half line period frequency to the first switch. A capacitor is preferably connected to the output of the peak value rectifier and to ground for providing a low pass filter.

A line delay stage can have an input connected to the output of the first switch and having an output connected to the input of the first amplifier. A second comparator stage can have an input connected to the output of the second amplifier. A second set point adjuster can have an output connected to an input of the second comparator stage. A memory storage element having an input connected to an output of the second comparator stage and having an output connected to an input of the first amplifier.

A third gate can receive the output signal from the coder. A decoder can receive an output signal from the third switch. A first digital analog converter can be connected to the decoder and provide a luminance output signal. A fourth gate can be connected to the output signal of the coder. A comparator stage can have an input connected to the output of the fourth gate. A first set point adjuster can have its output connected to the comparator stage. A second digital analog converter can have an input connected to the decoder. A third amplifier can have an input connected to the digital to analog converter and have an input connected to the output of the comparator stage for receiving a correcting variable. A second switch can have an input connected to an output of the third amplifier and can have an input connected to the decoder for receiving a switching voltage of the half line frequency. An amplitude adjustment provision can have an input connected to the output of the third amplifier and providing color difference signal output.

There is also provided a method for analog digital conversion of a color television signal which comprises switching incoming color difference signals with a first switch running at half line scanning time periods, amplifying the output of the first switch, converting an analog output of the first switch into a digital signal in an analog to digital converter, feeding the output signal of the analog to digital converter to a coder, feeding an output signal of the first switch to a second gate rectifying signal peaks of the output of the second gate with a signal peak rectifier, low pass filtering the output of the signal peak rectifier, generating a color carrier signal in an oscillator, feeding the output of the oscillator to a first gate, amplifying the output of the first gate in a second amplifier, correcting the amplification of the first and of the second amplifier with a signal from the peak rectifier, and providing an output transmission signal from an output of the second amplifier and from the coder.

The output of the peak signal rectifier can be compared with a set point adjuster output in a second comparator stage. An output of the second comparator stage can be fed to a memory storage. The amplification factor of the first and second amplifier can be controlled with an output of the memory storage. The output signal of the first switch can be delayed in a delay stage. An output of the delay stage can be fed to a input of the first amplifier.

An output signal of the decoder and of the second amplifier can be transmitted. The transmitted signal can be gated in a third gate and in a fourth gate disposed in parallel. An output of the third gate can be fed to a decoder. An output of the decoder can be entered to an input of a first digital to analog converter for generating a luminance signal output. An output of the decoder can be fed to a second digital to analog converter. An analog output of the second digital to analog converter can be fed to a third amplifier. An output of the fourth gate can be compared with a reference signal from a first set point adjuster in a first comparator stage. An output of the first comparator stage can be furnished to the third amplifier for adjusting the level of amplification. An output of the third amplifier can be entered into an input of a second switch. The second switch can be controlled with a half line scanning period signal provided by an output of the decoder. Color difference signals can be provided at outputs of the second switch.

An embodiment of the invention is based in part of the following consideration. If, for example, a signal has only a smaller amplitude over a longer period of time then the available modulation range of the converter is not fully used. In order to better use the modulation range and in order to achieve a better signal to noise ratio, the amplitude of the signal is increased to such an extent that the modulation range of the converter is used and the signal to noise ratio is improved for the transmission. The transmitted signal is then by itself in error regarding to its amplitude. However, based on a simultaneously transmitted identifying and characterizing signal, this erroneous amplitude can be reversed on the receiver, even after the digital to analog reconversion. The control of the amplification of the signals ahead of the analog to digital converter is provided at a relatively slow speed, for example with a time constant of a multiple of the time duration of a line or a half picture field.

According to a further embodiment of the invention, in each case the maximum occurring amplitude of the signal is determined during a certain period of time, in particular during a line. A correcting variable constant during the time period is obtained from this. The correcting variable controls the amplification of the signal such that the signal assumes the full modulation range of the converter independently of its original amplitude. In this case each time a signal section is evaluated individually, and the signal level is brought to the modulation range of the converter by an amplification change which is constant during such time period.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

DESCRIPTION OF INVENTION AND PREFERRED EMBODIMENTS

Figure 1:
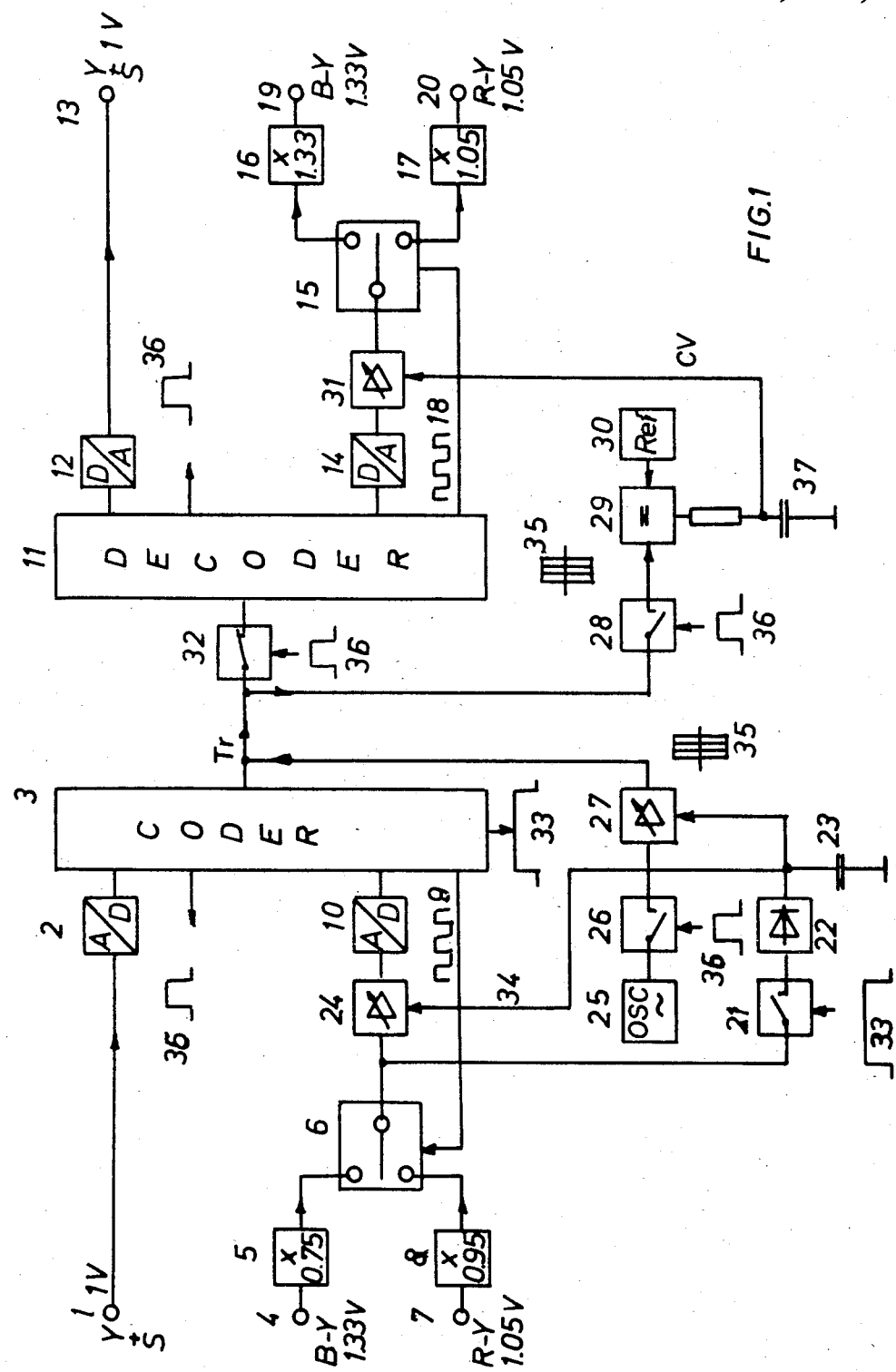
FIG. 1 is a view of a schematic diagram of a circuit according to a first embodiment of the invention.

In accordance with the present invention there is provided a circuit for analog to digital conversion of a color television signal, which is entered over three separated paths 1,4,7 and which comprises a luminance signal Y, a first and a second color difference signal B-Y, R-Y. The color difference signals occur alternatingly from line to line. Amplitude adjustment means 5,8,24 are disposed in the path of the color difference signals toward the analog to digital converter 10. The amplitude adjustment means can be set and/or controlled such that the maximum amplitude of the signal B-Y, R-Y becomes independent of its original amplitude and assumes approximately the full modulation range of the converter 10.

The two color difference signals can be brought to the same maximum amplitude of for example 1 volt, and this maximum amplitude can be applied to the same analog to digital converter 10. The color difference signals B-Y, R-Y can be applied via an amplitude adjustment provision 5,8 to the inputs of a line frequency actuated switch, and the output of the switch can be connected to the analog to digital converter 10. The luminance signal Y including the synchronizing pulse and the color difference signals B-Y, R-Y can have the same maximum amplitudes at the inputs of the converters 2,10. The sequence of the color difference signals B-Y, R-Y can be applied to the input of a digital to analog converter 14 for digital to analog conversion. The output of the digital to analog converter 14 can be alternatingly connected to the two color difference signal paths 19,20 which are actuated with a picture line frequency controlled switch 15. Amplitude adjustment provisions 16,17 can be disposed in the color difference signal paths 19,20 such that the signals assume again their original different maximum amplitudes of about 1.33 volts and 1.05 volts.

The amplitude adjustment means 24 can be controlled by the amplitude of the signal derived correcting variable CV such that the signal becomes independent of its original maximum amplitude and assumes always about the full modulation range of the converter 10. Preferably, the correcting variable CV is generated by peak value rectification of the signal in a rectifier 22. A low pass filter 23 with a time constant of from about 20 to 500 milliseconds and preferably from about 50 to 200 milliseconds can be disposed in the path of the correcting variable. The time constant can be in particular about 100 milliseconds.

Figure 2:
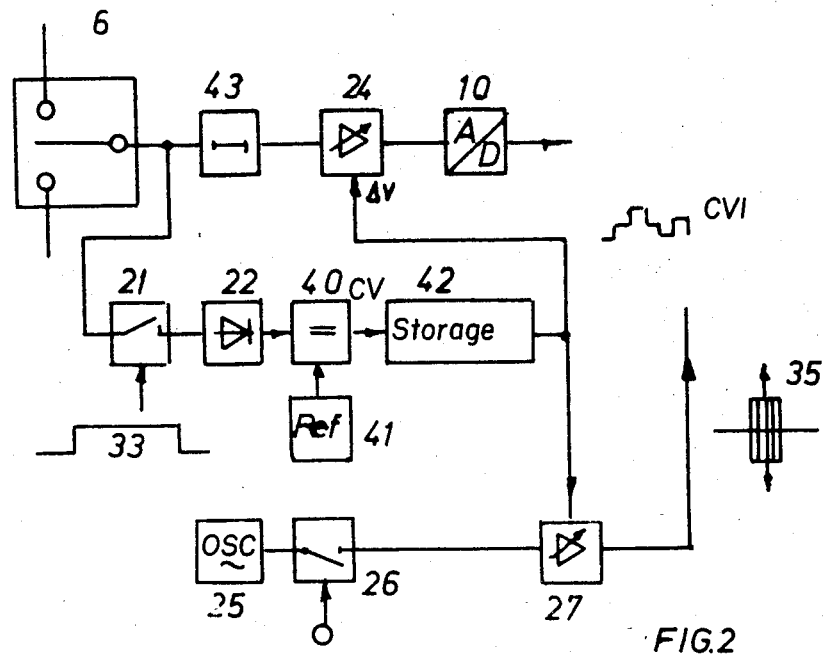
FIG. 2 is a view of a schematic circuit diagram modifying the circuit of FIG. 1.
Figure 3:
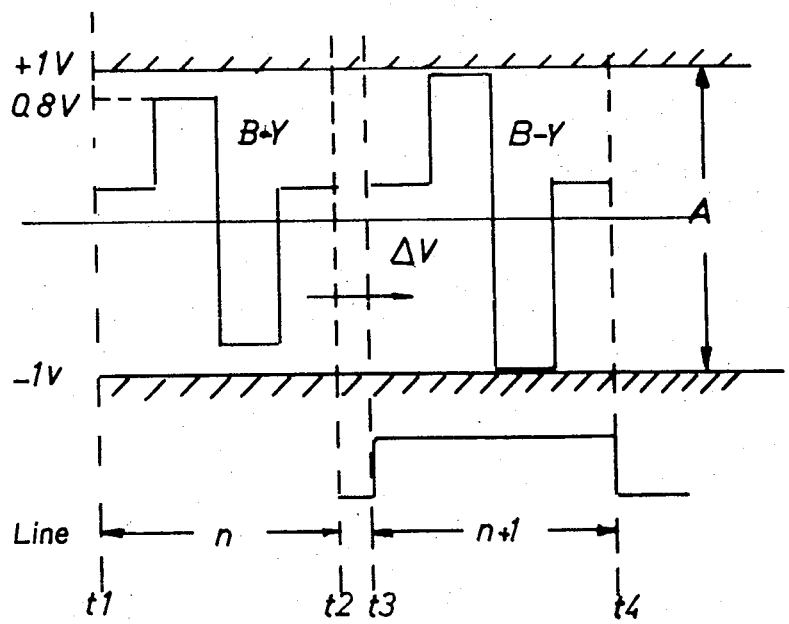
FIG. 3 is a view of a diagram showing the voltages of the signal versus time.

The maximum amplitude of the signal B-Y can be determined during a defined time period t1-t2, and the amplitude of the signal can be controlled with a correcting variable CV, which is constant for the duration of the time period and which is obtained via the determination of the amplitude B-Y. This assures that the maximum amplitude uses the full modulation range A as shown in FIGS. 2 and 3. The correcting variable CV obtained during a time period t1-t2 can alternatingly control the amplitude of the signal delayed for the duration of a time period during the sequentially following time period t3-t4. The time period is preferably equal to the duration of a line period. The value of the correcting variable CV can be transmitted with a control signal via the transmission line Tr fed by the converter 10, and the control signal can be employed after the digital to analog reconversion in the converter 14 for the reconversion of the amplitude of the signal to the original value with amplifier 31.

Referring now to FIG. 1, the luminance signal with the synchronizing signal (Y+S) is applied to the terminal 1 with a maximum amplitude of about 1 volt, where the maximum amplitude refers in the following to the signal value from peak to peak. The signal Y+S is then fed via the analog to digital converter 2 to the coder 3, which feeds the transmission line. The color difference signal B-Y is applied to the terminal 4 with a maximum amplitude of about 1.33 volts. This signal is brought to a maximum amplitude of 1 volt with the amplitude adjustment means 5 with the divider factor 0.75 and is then fed to the first input of the switch 6. The R-Y signal is present at the terminal 7 with a maximum amplitude of about 1.05 volts. This signal is brought to a maximum amplitude of about 1 volt in the divider stage 8 with the dividing factor of about 0.95, and it is then fed to the other input of the switch 6. The switch 6 is controlled by the coder 3 via the half line frequency controlled voltage 9 such that alternating from line to line the signal B-Y and the signal R-Y pass with the same maximum amplitude to the analog to digital converter 10. The digital output signal of the converter 10 passes also to the coder 3. The decoder 11, which provides the digital output signals for Y, B-Y and R-Y, is disposed at the end of the transmission path Tr. The coder 3, the transmission path Tr and the decoder 11 form, for example in the case of a video recorder with timeplex recording, the time compression during the recording, the recording itself, and the time expansion during the reproduction.

The digital luminance and synchronizing signal at the output of the decoder 11 is reconverted with the digital to analog converter 12 again into the analog luminance and synchronizing signal Y+S, which is again available with a maximum amplitude of about 1 volt at the the terminal 13. The digital output signal of decoder 11 for the signal B-Y, R-Y passes to the digital to analog converter 14. The output of the digital to analog converter 14 is fed via the switch 15 and, alternating from line, to line, to the input of the amplitude adjustment provision 16 with a factor of 1.33 and to the input of the amplitude adjustment provision 17 with the factor 1.05. This switching is performed with the switching voltage 18 of half line frequency coming from the decoder 11. The analog color difference signal B-Y with the original maximum amplitude of 1.33 volts is again present at the terminal 19, and the color difference signal R-Y with the original amplitude of 1.05 volts is again available at terminal 20.

The signal level adjustment provisions 8,17 in the path of the R-Y signal can be eliminated if desired, snce the maximum amplitude of the signal deviates only slightly from the value of 1 volt.

In addition, the color difference signals are fed from the output of the switch 6 to the gate 21 which is controlled by the pulse 33 having the duration of the forward line scanning time of 52 microseconds or passage of signals. The color difference signal during the time forward scanning time is rectified with the peak value rectifier 22, and its generates at the capacitor 23 the correcting variable CV with a time constant of about 100 milliseconds. This correcting variable CV controls the amplification of the amplifier 24 in the path of the color difference signal via the line 34 such that the maximum amplitude of the color difference signals at the input of the converter 10 assumes the full amplitude range of the converter 10 independently of the original amplitude. The color carrier is generated in the oscillator 25 and a color synchronizing signal is generated at the start of each line by the gating pulse 36 with the gate 26. This color synchronizing signal 35 is modulated in amplitude in the amplifier 27 by the correcting variable CV and is then fed to the transmission Tr. The color synchronizing signal 35 is kept away from the decoder 11 by the gate 32, which is blocked during the rear porch and is fed via the gate 28 switched with a gating pulse for open transmission to the comparator stage 29. The amplitude of the color synchronizing signal 35 is compared in its amplitude with a reference set point from set point adjuster 30 in a comparison stage 29. The comparison stage 29 provides a correcting variable CV at the capacitor 37. The correcting variable controls the amplification of the amplifier 31 reciprocally to the amplification control of the amplifier 24 such that the color difference signals at the input of the switch 15 again have their proper amplitudes. If, for example, the color difference signals B-Y and R-Y have a lower amplitude over a longer time period of several half picture fields based on a low color saturation of the picture, then the amplification of the amplifier 24 is increased by the correcting variable, and the amplification of the amplifier 31 is correspondingly reduced by the correcting variable CV such that the signals at the terminals 4 and 19 or, respectively, 7 and 20 agree again in their amplitude.

Another embodiment for an amplitude change is shown in FIGS. 2 and 3. This amplitude change is effected only for the time duration of a line. During the line N of the time t1-t2 the maximum amplitude of the B-Y signal is evaluated in the peak amplitude rectifier 22, and the maximum amplitude of the B-Y signal in the instant case is 0.8 volt. The modulation range A of plus 1 to minus 1 volt would not be fully exploited based on such a signal. The correcting variable CV is generated in the comparator stage. 31 which is fed by a reference signal stage 41. The correcting variable is a measure for the maximum amplitude value occurring during the line N of the signal B-Y or, respectively, the difference between this value (0.8 volt) and the modulation range (1 volt) of the converter 10. The correcting variable CV is stored in the memory storage 42 and retains initially its constant value. The correcting variable CV appears at the input of the controllable amplifier 24 during the line N+1 and the time t3-t4. The signal B-Y is fed to the controllable amplifier 24 via the line delay stage 43. The amplifier 24 also receives the B-Y signal from the line N and the correcting variable CV, which is a measure for the maximum amplitude of the line. The correcting variable CV changes the amplification of the amplifier 24 by the value ΔV such that now the signal B-Y assumes the full modulation range A in the line N+1. The amplitude of the signal B-Y is increased in the line N+1 based on the set parameter V obtained in line N. The signal B-Y from line N is delayed by one line in order to be available for line N+1. In this way, a change of the amplification of the amplifier 24 is performed line by line, and thus the amplitude of the signals at the input of the converter 10 are changed in the sense that at each line the maximum amplitude of the signal assumes the modulation range of the converter 10. The thus represented step-wise correcting variable CV1, the value of which is constant in each case over a line duration and the value of which can change from line to line, is applied to the input of the amplifier 24. Thus at the start of a line, the correcting variable from the line preceding in time is extinguished and erased and replaced by the correcting variable gained for the new line. The correcting variable CV is transmitted as shown in FIG. 1 via amplitude modulation of the color synchronizing signal 35.

A change in the amplification of the amplifier 31 is provided reciprocally to the change in the amplification of the amplifier 24 after the digital to analog conversion on the reciever side as shown in FIG. 1 such that the color difference signals again have their original amplitudes.

If one considers that the color signal hardly changes from line to line, then the amplitude measurement value of the the line N can control the color signal amplitude of the line N+2.

The invention circuit is particularly important in the case of a timeplex system for the color difference signals since these are compressed by a high value of about 5 and again expanded. However, the invention can also be employed for the luminance signal Y in order to fully modulate the analog to digital converter 2.

Again the switch 6 in FIG. 2 can control and acts on the reference voltage stage 41. This achieves that the maximum amplitude adaptation stages 5,8 are replaced by a line related switching of the reference signal level.

It will be understood that each of the elements described above, or two or more together, may also find a useful application in other types of video signal transmisson system configurations and high frequency signal processing procedures differing from the types described above.

While the invention has been illustrated and described as embodied in the context of a circuit for analog digital conversion of a color television signal, it is not intended to be limited to the details shown, since various modifications and strucutral changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A circuit for analog digital conversion of a color television signal comprising
   an input path for a luminance signal;
   an input path for a first color difference signal;
   an input path for a second color difference signal;
      amplitude adjustment means associated with the path of the first color difference signal and associated with the path of the second color difference signal for adjusting the maximum amplitudes of the color difference signals independently of their original amplitude;

an analog digital converter connected to the output of the amplitude adjustment means, and wherein the amplitude adjustment means is controlled by a correcting variable derived from the signal amplitude such that the signal assumes continuously about the full modulation range of the converter independent of its original amplitude and wherein the value of the correcting variable is transmitted with a control signal over the transmission distance fed by the analog to digital converter and where the value of the correcting variable serves to reset the signal amplitude to the original value after a digital to analog conversion; and a rectifier connected to the output of the analog to digital converter for rectifying the peak values of the signal.

2. The circuit for analog digital conversion of a color television signal according to claim 1 further comprising a low pass filter having a time constant of from about 20 to 500 milliseconds and disposed in the path of the correcting variable following the rectifier.

3. The circuit for analog digital conversion of a color television signal according to claim 1 wherein the maximum amplitude of the color difference signal (B-Y) is determined during a defined period of time (t2-t1) and wherein the amplitude of the signal is controlled such that the maximum amplitude covers the modulation range for the duration of a time period with a constant correcting variable obtained from the signal (B-Y).

4. The circuit for analog digital conversion of a color television signal according to claim 3 wherein the correcting variable obtained during a time period (t1-t2) controls in the sequentially following time period (t3-t4) the amplitude of of the signal delayed by the duration of the time period.

5. The circuit for analog digital conversion of a color television signal according to claim 3 wherein the time duration period is equal to the duration of a line scanning period.

6. The circuit for analog digital conversion of a color television signal according to claim 1 further comprising a first switch connected to an output of the amplitude adjustment means;

a first amplifier connected to the output of the first switch and to the input of the analog digital converter;

a coder connected to an output of the analog to digital converter and having an output for transmitting a signal;

an oscillator for generating a color carrier signal;

an analog digital converter connected to the input path of the luminance signal and having its output connected to the coder;

a first gate having an input connected to an output of the oscillator;

a second amplifier having its input connected to the output of the gate;

a second gate connected to the output of of the first switch;

a peak value rectifier having an input connected to an output of the second gate and having an output connected to the first amplifier and to the second amplifier for modulation of the respective amplification factor; and a connection from the coder to the first switch providing a switching voltage of half line period frequency to the first switch;

a capacitor connected to the output of the peak value rectifier and to ground for providing a low pass filter.

7. The circuit for analog digital conversion of a color television signal according to claim 6 further comprising a line delay stage having an input connected to the output of the first switch and having an output connected to the input of the first amplifier;

a second comparator stage having an input connected to the output of the second amplifier;

a second set point adjuster having an output connected to an input of the second comparator stage;

a memory storage element having an input connected to an output of the second comparator stage and having an output connected to an input of the first amplifier.

8. The circuit for analog digital conversion of a color television signal according to claim 6 further comprising a third gate receiving the output signal from the coder;

a decoder receiving an output signal from the third gate;

a first digital analog converter connected to the decoder and providing a luminance output signal;

a fourth gate connected to the output signal of the coder;

a comparator stage having an input connected to the output of the fourth gate;

a first set point adjuster having its output connected to the comparator stage;

a second digital analog converter having an input connected to the decoder;

a third amplifier having an input connected to the digital to analog converter and having an input connected to the output of the comparator stage for receiving a correcting variable;

a second switch having an input connected to an output of the third amplifier and having an input connected to the decoder for receiving a switching voltage of the half line frequency; and an amplitude adjustment provision having an input connected to the output of the third amplifier and providing color difference signal output.

9. A method for analog digital conversion of a color television signal comprising switching incoming color difference signals with a first switch running at half line scanning time periods;

amplifying the output of the first switch;

converting an analog output of the first switch into a digital signal in an analog to digital converter;

feeding the output signal of the analog to digital converter to a coder;

feeding an output signal of the first switch to a second gate;

rectifying signal peaks of the output of the second gate with a signal peak rectifier;

low pass filtering the output of the signal peak rectiifer; generating a color carrier signal in an oscillator;

feeding the output of the oscillator to a first gate;

amplifying the output of the first gate in a second amplifier;

correcting the amplification of the first and of the second amplifier with a signal from the peak rectifier; and providing an output transmission signal from an output of the second amplifier and from the coder.

10. The method for analog digital conversion of a color television signal according to claim 9 further comprising comparing the output of the peak signal rectifier with a set point adjuster output in a second comparator stage;

feeding an output of the second comparator stage to a memory storage;

controlling the amplification factor of the first and second amplifier with an output of the memory storage;

delaying the output signal of the first switch in a delay stage; and feeding an output of the delay stage to an input of the first amplifier.

11. The method for analog digital conversion of a color television signal according to claim 8 further comprising transmitting an output signal of the decoder and of the second amplifier;

gating the transmitted signal in a third gate and in a fourth gate disposed in parallel;

feeding an output of the third gate to a decoder; and entering an output of the decoder to an input of a first digital to analog converter for generating a luminance signal output;

feeding an output of the decoder to a second digital to analog converter;

feeding an analog output of the second digital to analog converter to a third amplifier;

comparing an output of the fourth gate with a reference signal from a first set point adjuster in a first comparator stage;

furnishing an output of the first comparator stage to the third amplifier for adjusting the level of amplification;

entering an output of the third amplifier into an input of a second switch;

controlling the second switch with a half line scanning period signal provided by an output of the decoder; and providing color difference signals at outputs of the second switch.

12. A circuit for analog to digital conversion of a color television signal, which includes in three different paths (1, 4, 7) a signal relating to a luminous density (Y), a first and a second chrominance signal (B-Y), (R-Y), where the chrominance signals alternate going from line to line, characterized in that in each case the signal fed to an analog digital converter (2,6) is controlled in its amplitude by a set parameter (Us) derived from the original amplitude of the signal such that the signal assumes always about the full control amplitude region of a converter (10) and that the set parameter (Us) is transmitted with a control signal via the transmission line (U) fed by the converter (10) and the set parameter serves for feedback controlling the amplitude of the signal to the original amplitude (amplifier 31).

13. The circuit for analog digital conversion of a color television signal according to claim 12 further comprising a low pass filter having a time constant of from about 20 to 500 milliseconds and disposed in the path of the correcting variable following the rectifier.

14. The circuit for analog digital conversion of a color television signal according to claim 12 wherein the maximum amplitude of the color difference signal (B-Y) is determined during a defined period of time (t2-t1) and wherein the amplitude of the signal is controlled such that the maximum amplitude covers the modulation range for the duration of a time period with a constant correcting variable obtained from the signal (B-Y).

15. The circuit for analog digital conversion of a color television signal according to claim 14 wherein the correcting variable obtained during a time period (t1-t2) controls in the sequentially following time period (t3-t4) the amplitude of of the signal delayed by the duration of the time period.

16. The circuit for analog digital conversion of a color television signal according to claim 14 wherein the time duration period is equal to the duration of a line scanning period.

17. The circuit for analog digital conversion of a color television signal according to claim 12 further comprising a first switch connected to an output of the amplitude adjustment means;

a first amplifier connected to the output of the first switch and to the input of the analog digital converter;

a coder connected to an output of the analog to digital converter and having an output for transmitting a signal;

an oscillator for generating a color carrier signal;

an analog digital converter connected to the input path of the luminance signal and having its output connected to the coder;

a first gate having an input connected to an output of the oscillator;

a second amplifier having its input connected to the output of the gate;

a second gate connected to the output of of the first switch;

a peak value rectifier having an input connected to an output of the second gate and having an output connected to the first amplifier and to the second amplifier for modulation of the respective amplification factor; and a connection from the coder to the first switch providing a switching voltage of half line period frequency to the first switch a capacitor connected to the output of the peak value rectifier and to ground for providing a low pass filter.

18. The circuit for analog digital conversion of a color television signal according to claim 17 further comprising a line delay stage having an input connected to the output of the first switch and having an output connected to the input of the first amplifier;

a second comparator stage having an input connected to the output of the second amplifier;

a second set point adjuster having an output connected to an input of the second comparator stage;

a memory storage element having an input connected to an output of the second comparator stage and having an output connected to an input of the first amplifier.

19. The circuit for analog digital conversion of a color television signal according to claim 17 further comprising
- a third gate receiving the output signal from the coder;
- a decoder receiving an output signal from the third gate;
- a first digital analog converter connected to the decoder and providing a luminance output signal;
- a fourth gate connected to the output signal of the coder;
- a comparator stage having an input connected to the output of the fourth gate;
- a first set point adjuster having its output connected to the comparator stage;
- a second digital analog converter having an input connected to the decoder;
- a third amplifier having an input connected to the digital to analog converter and having an input connected to the output of the comparator stage for receiving a correcting variable;
- a second switch having an input connected to an output of the third amplifier and having an input connected to the decoder for receiving a switching voltage of the half line frequency; and
- an amplitude adjustment provision having an input connected to the output of the third amplifier and providing color difference signal output.

* * * * *